Aug. 28, 1934.  H. H. TYROFF  1,971,884
DEVICE FOR REMOVING FROZEN ICE TRAYS
Filed Nov. 26, 1932
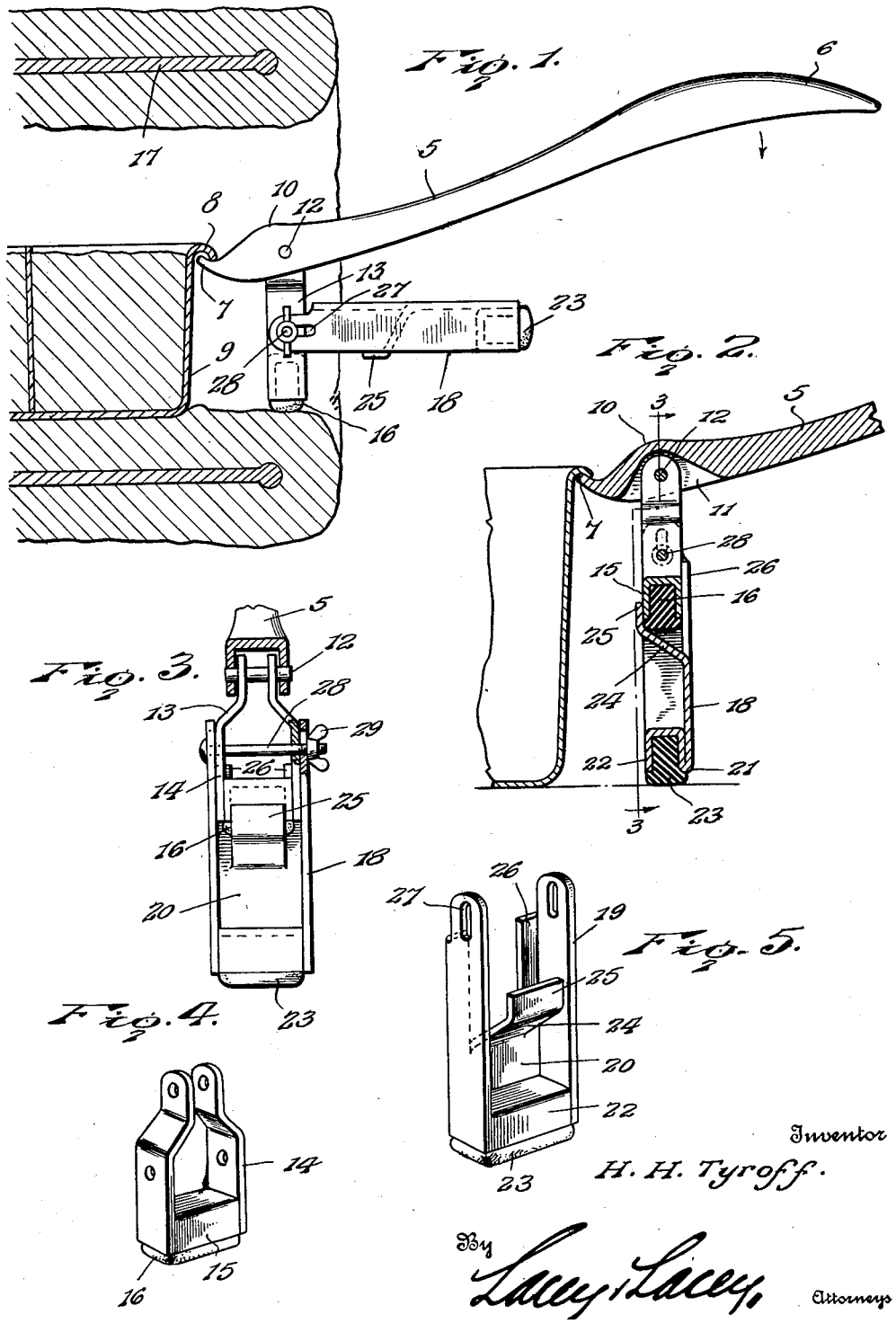

Patented Aug. 28, 1934

1,971,884

UNITED STATES PATENT OFFICE 1,971,884

DEVICE FOR REMOVING FROZEN ICE TRAYS

Herbert Herman Tyroff, San Antonio, Tex.

Application November 26, 1932, Serial No. 644,513

11 Claims. (Cl. 254—130)

This invention relates to a tool or implement for removing frozen ice trays from mechanical refrigerators.

The object of the invention is to provide a tool of a simple and inexpensive construction especially adapted for use in connection with electric and other domestic ice plants and by means of which trays of ice cubes may be readily removed from a tray container should said trays become wedged or frozen therein, due to an excessive deposit of frost or ice on or around said trays.

A further object of the invention is to provide a tool of the character described which may be used on any type or style of mechanical refrigerator having a conventional ice tray and which will effectually release and permit removal of the ice trays with very little exertion on the part of the operator.

A further object is to provide a tool including a handle having main and auxiliary heels pivotally connected therewith and constituting fulcrums when the handle is tilted, whereby the tool may be adapted to ice trays of different heights.

A further object is to so construct the tool that one of said fulcrums may be swung to inoperative position while the other is in use, means being provided for holding the fulcrums in vertical alinement under certain conditions of use.

A still further object of the invention is to generally improve this class of devices so as to increase their utility, durability and efficiency.

In the accompanying drawing forming a part of the specification:

Figure 1 is a side elevation of a tray releasing tool constructed in accordance with the present invention, showing the main fulcrum in use and the auxiliary fulcrum swung laterally to inoperative position.

Figure 2 is a vertical sectional view showing the main and auxiliary fulcrums held in vertical alinement to permit the use of the tool on relatively high or deep ice trays.

Figure 3 is a vertical sectional view, partly broken away, taken on the line 3—3 of Figure 2.

Figure 4 is a detail perspective view of the main fulcrum detached.

Figure 5 is a similar view of the auxiliary fulcrum detached.

Similar reference characters designate like parts in all the views of the drawing.

The tool comprises a lever 5 having one end thereof curved downwardly to form a handle 6 and its other end provided with an upwardly extending lip 7 adapted to extend beneath the reinforcing bead 8 of an ice tray indicated at 9. That portion of the lever adjacent the lip 7 is preferably thickened at 10 and the lower face of the lever immediately beneath said thickened portion is provided with a recess 11 in which is pivotally mounted, at 12, a main fulcrum 13. The fulcrum 13 comprises spaced arms 14 having their upper ends deflected inwardly and extended within the recess 11 and their lower ends connected by a substantially U-shaped cross bar 15 forming a seat or socket for a traction shoe or pad 16 preferably formed of yieldable material such as rubber or the like. The main fulcrum 13 is employed when the lever 5 is used for releasing frozen ice trays of the type shown in Figure 1 of the drawing and in which event the traction shoe 16 of the main fulcrum 13 is positioned on the surface of the ice surrounding the tray container 17, the shoe 16 serving to prevent slippage of the main fulcrum when the handle 6 is depressed to effect the release of the tray containing the cubes of ice.

Pivotally connected to and nesting with the main fulcrum 13 is an auxiliary fulcrum 18 which is brought into play when the frozen tray to be removed is of greater height than that shown in Figure 1 of the drawing. The auxiliary fulcrum 18 is preferably stamped or otherwise formed from a single sheet of metal and comprises side walls 19 connected by a rear wall 20, the metal constituting the rear wall 20 being bent upon itself at 21 and thence extended upwardly, laterally and downwardly, as indicated at 22, to form a seat or socket adapted to receive a yieldable traction shoe 23 similar in construction to the traction shoe 16. The metal constituting the upper end of the rear wall 20 is provided with spaced incisions and the metal between said incisions bent laterally and upwardly to form a brace 24 terminating in an upstanding locking lip 25 adapted to bear against the cross bar 15 of the main fulcrum for supporting the fulcrums rigidly in vertical alinement with each other. Disposed on opposite sides of the inclined brace 24 are vertical guide flanges 26 against which one side of the cross bar rests when the lip 25 is in engagement with the opposite side of the cross bar. The upper ends of the side walls of the auxiliary fulcrum are provided with elongated slots 27 through which extends a pin 28 which forms a pivotal connection between the main and auxiliary fulcrums and permits the auxiliary fulcrum to be swung laterally and upwardly to the position shown in Figure 1 of the drawing, when the main fulcrum is in use. One end of the pin is threaded for engagement with a wing nut 29 which bears against the adjacent wall 19 of the auxiliary fulcrum and serves to hold the auxiliary fulcrum in operative position when desired. The slots 27 permit a limited longitudinal movement of the auxiliary fulcrum with respect to the main fulcrum so that by pulling downwardly on the auxiliary fulcrum until the locking lip 25 clears the cross bar 15, the auxiliary fulcrum may be swung upwardly and laterally to inoperative position, as previously stated.

When the device is to be used for removing relatively shallow frozen ice trays, the auxiliary fulcrum is pulled downwardly and then swung laterally to the position shown in Figure 1 of the drawing, and in which position it may be retained, if desired, by tightening the wing nut 29. With the auxiliary fulcrum in elevated position, the traction shoe 16 of the main fulcrum will be exposed and the tool is then positioned adjacent the tray to be removed, with the traction shoe of the main fulcrum bearing against the wall of the tray container or against the ice or frost covering the same and with the lip 7 extending beneath the flange 8 of the tray to be removed. A slight downward pressure is then exerted on the handle 6, which rocks the lever on the main fulcrum and effectually releases the tray from the ice so as to permit the tray to be conveniently removed from the refrigerator.

When the frozen tray to be removed is relatively deep, the auxiliary fulcrum is swung downwardly and laterally to the position shown in Figure 2 of the drawing and a slight upward pressure exerted on the lower end of the auxiliary fulcrum, which causes the lip 25 of the auxiliary fulcrum to engage the cross bar of the main fulcrum and in which position said fulcrums will be securely held in vertical alinement. With the parts thus assembled, the traction shoe 23 of the auxiliary fulcrum is positioned adjacent the tray to be removed and a slight downward pressure exerted on the operating handle to effect the release of the tray in the manner before stated. It will, of course, be understood that the fulcrums may be made in different lengths and sizes according to the type of tray to be removed but it has been found in actual practice that a tool provided with main and auxiliary fulcrums of the relative proportions shown and capable of being brought successively into use will meet the requirements necessary to remove all types of conventional ice trays.

It will be noted that the device is essentially in the nature of a portable tool or implement adapted to be used in connection with any type of mechanical refrigerator and does not form a part of nor is it in any manner permanently attached to the refrigerator. The device is comparatively simple and compact in construction and may be kept either within the refrigerator or in a kitchen drawer or other convenient place and removed therefrom for use whenever it is found that the ice trays are frozen and cannot be conveniently removed from the container.

Having thus described the invention, what I claim is:

1. A device of the class described comprising a lever having a work engaging lip at one end thereof, a main fulcrum pivotally connected with the lever near said lip, an auxiliary fulcrum having a pin and slot connection with the main fulcrum and movable longitudinally and laterally to inoperative position to permit use of the main fulcrum, and means carried by the auxiliary fulcrum and adapted to overlap and bear against the opposite sides of the main fulcrum for holding said fulcrums in vertical alinement with each other.

2. A device of the class described comprising a lever, a main fulcrum pivotally connected with the lever, an auxiliary fulcrum having a pin and slot connection with the main fulcrum and adapted to be moved longitudinally and laterally to inoperative position to permit use of the main fulcrum, spaced guide flanges carried by the auxiliary fulcrum, and a locking lip coacting with the guide flanges for preventing independent lateral swinging movement of the auxiliary fulcrum when said fulcrums are in vertical alinement with each other.

3. A device of the class described comprising a lever, normally nested pivotally connected main and auxiliary fulcrums of different lengths operatively connected with the lever and each provided with a terminal traction shoe, a guide flange carried by one of said fulcrums, and a locking lip coacting with the guide flange for preventing independent lateral swinging movement of the auxiliary fulcrum when said fulcrums are in vertical alinement with each other.

4. A device of the class described comprising a lever having one end thereof provided with an upstanding terminal work engaging lip and its other end formed with a handle, there being a recess in the lower face of the lever adjacent said lip, a fulcrum pivotally mounted for swinging movement in said recess and having its lower end formed with a seat, and a traction shoe fitted to said seat.

5. A device of the class described comprising a lever having means at one end thereof for engagement with an ice tray, a main fulcrum pivotally mounted on the lever, an auxiliary fulcrum pivotally mounted on the main fulcrum and provided with a guide flange, said auxiliary fulcrum having limited vertical movement with respect to the main fulcrum, and a locking lip carried by the auxiliary fulcrum and adapted to engage the main fulcrum for holding said main fulcrum against the guide flange when the fulcrums are in alinement with each other.

6. A device of the class described comprising a lever having means at one end thereof for engagement with an ice tray, a main fulcrum pivotally connected with the lever and provided with a terminal traction shoe, an auxiliary fulcrum having a pin and slot connection with the main fulcrum and provided with an upstanding lip adapted to engage the traction shoe of the main fulcrum for holding said fulcrums in vertical alinement, and a traction shoe carried by the auxiliary fulcrum.

7. A device of the class described comprising a lever having means at one end thereof for engagement with an ice tray, a main fulcrum pivotally mounted on the lever and provided with a U-shaped socket, a traction shoe fitted in said socket, an auxiliary fulcrum having a pin and slot connection with the main fulcrum and provided with spaced flanges adapted to engage one side of the socket, an inclined brace forming part of the main fulcrum and terminating in an upstanding lip adapted to engage the other side of the socket for holding said fulcrums in vertical alinement with each other, and a traction shoe carried by the auxiliary fulcrum.

8. A device of the class described comprising a lever having means at one end thereof for engagement beneath the flange of an ice tray, a main fulcrum pivotally connected with the lever and provided with a terminal traction shoe, an auxiliary fulcrum comprising spaced side walls connected by an end wall, the material forming the lower end of the end wall being bent upon itself to form a socket and the material at the upper end of the end wall being cut longitudinally to formed spaced flanges and an intermediate upwardly inclined brace terminating in a locking lip, there being longitudinal slots formed in the upper ends of the side walls, a traction shoe fitted in the socket of the auxiliary fulcrum, and a pivot pin extending through the slots and engaging the auxiliary fulcrum to permit lateral swinging movement of one relative to the other, said lip by engagement with the end of the main fulcrum serving to hold said fulcrums rigidly in vertical alinement with each other.

9. A device of the class described comprising a lever, normally nested main and auxiliary fulcrums operatively connected therewith, one of said fulcrums being movable longitudinally and laterally to inoperative position to permit use of the other, and means carried by the auxiliary fulcrum and adapted to overlap and bear against the opposite sides of the main fulcrum for holding said fulcrums in vertical alinement with each other.

10. A device of the class described comprising a lever, normally vertically alined pivoted connected nested fulcrums depending therefrom, one of which is movable longitudinally and laterally to inoperative position to permit use of the other, and means carried by the auxiliary fulcrum and adapted to overlap and bear against the opposite sides of the main fulcrum for holding said fulcrums in vertical alinement with each other.

11. A device of the class described comprising a lever, pivotally connected normally vertically alined nested fulcrums depending from and operatively connected with the lever near one end thereof and movable successively into engagement with a support, and means carried by one of the fulcrums and adapted to overlap and bear against the opposite sides of the other fulcrum for holding said fulcrums in vertical alinement with each other.

HERBERT HERMAN TYROFF.